(12) United States Patent
Bredberg et al.

(10) Patent No.: US 10,011,279 B2
(45) Date of Patent: Jul. 3, 2018

(54) METHOD AND SYSTEM FOR GUIDANCE OF DRIVER BEHAVIOUR DURING DRIVING OF VEHICLES

(71) Applicant: SCANIA CV AB, Södertälje (SE)

(72) Inventors: Linus Bredberg, Hägersten (SE); Olof Larsson, Skärholmen (SE)

(73) Assignee: SCANIA CV AB (SE)

( * ) Notice: Subject to any disclaimer, the term of this patent is extended or adjusted under 35 U.S.C. 154(b) by 39 days.

(21) Appl. No.: 14/650,889

(22) PCT Filed: Nov. 28, 2013

(86) PCT No.: PCT/SE2013/051405
§ 371 (c)(1),
(2) Date: Jun. 10, 2015

(87) PCT Pub. No.: WO2014/098716
PCT Pub. Date: Jun. 26, 2014

(65) Prior Publication Data
US 2015/0329115 A1      Nov. 19, 2015

(30) Foreign Application Priority Data

Dec. 17, 2012  (SE) ...................................... 1251432

(51) Int. Cl.
*B60W 30/14*  (2006.01)
*G01C 21/34*  (2006.01)
(Continued)

(52) U.S. Cl.
CPC ....... *B60W 30/143* (2013.01); *B60R 16/0236* (2013.01); *B60W 30/1882* (2013.01);
(Continued)

(58) Field of Classification Search
None
See application file for complete search history.

(56) References Cited

U.S. PATENT DOCUMENTS 6,374,173 B1   4/2002   Ehlbeck
2009/0157290 A1   6/2009   Ji et al.

FOREIGN PATENT DOCUMENTS

EP   2335964 A1   6/2011
EP   2 441 634 A2   4/2012
(Continued)

OTHER PUBLICATIONS

International Search Report dated Mar. 31, 2014 issued in corresponding International patent application No. PCT/SE2013/051405.
(Continued)

*Primary Examiner* — Mussa A Shaawat
*Assistant Examiner* — Kyung Kim
(74) *Attorney, Agent, or Firm* — Ostrolenk Faber LLP

(57) ABSTRACT

A method for guidance of driver behavior during driving of a vehicle (1) in hilltop driving: the steps of continuously determining topography along the vehicle's itinerary for determining a profile of the vehicle's speed (v); presenting (S2) the vehicle driver with suggestions for action concerning the driving of the vehicle for a desired reduction of fuel consumption, the action includes reduced power mobilization before a hilltop transition. A profile of the vehicle speed (v) is determined as a result of the action, whereby the step of presenting (S2) the vehicle's driver with suggestions for said action, is subject to consideration to subconditions. The subconditions include requirements in response to reduced power mobilization, the speed of the vehicle (1) relative to a reference level ($v_{ref}$) should: drop by a predetermined largest amount before the hilltop transition; drop by a predetermined smallest amount before the hilltop transition; reach or exceed the reference level ($v_{ref}$) after the hilltop transition. Also disclosed is a system for guidance of driver behavior during driving of a vehicle in hilltop driving, a
(Continued)

motor vehicle practicing the method and a system and a computer program for executing the method.

6 Claims, 3 Drawing Sheets

(51) Int. Cl.
  *B60W 40/09* (2012.01)
  *B60R 16/023* (2006.01)
  *B60W 30/188* (2012.01)
  *G07C 5/08* (2006.01)
  *B60W 50/14* (2012.01)

(52) U.S. Cl.
  CPC ......... *B60W 40/09* (2013.01); *G01C 21/3469* (2013.01); *G07C 5/0816* (2013.01); *B60W 2050/146* (2013.01); *B60W 2520/10* (2013.01); *B60W 2540/30* (2013.01); *B60W 2550/142* (2013.01); *B60W 2550/143* (2013.01); *B60W 2720/103* (2013.01); *Y02T 10/52* (2013.01); *Y02T 10/84* (2013.01)

(56) References Cited

FOREIGN PATENT DOCUMENTS

| EP | 2 476 596 A1 | 7/2012 |
| JP | 2010-183687 A | 8/2010 |
| KR | 10-1127443 B1 | 3/2012 |
| WO | WO 2010/059110 A1 | 5/2010 |
| WO | WO 2010/138060 A1 | 12/2010 |
| WO | WO 2010/144031 A1 | 12/2010 |
| WO | WO 2012/158097 A1 | 11/2012 |

OTHER PUBLICATIONS

International Preliminary Report on Patentability dated Mar. 23, 2015 issued in corresponding International patent application No. PCT/SE2013/051405.
Korean Office Action, dated Oct. 10, 2016, issued in corresponding Korean Patent Application No. 10-2015-7018959. Includes English translation. Total 11 pages.
Supplementary European Search Report, dated Dec. 7, 2016, issued in corresponding European Patent Application No. EP 13864228. Total 2 pages.

METHOD AND SYSTEM FOR GUIDANCE OF DRIVER BEHAVIOUR DURING DRIVING OF VEHICLES

CROSS-REFERENCE TO RELATED APPLICATIONS

The present application is a 35 U.S.C. §§ 371 national phase conversion of PCT/SE2013/051405, filed Nov. 28, 2013, which claims priority of Swedish Patent Application No. 1251432-9, filed Dec. 17, 2012, the contents of which are incorporated by reference herein. The PCT International Application was published in the English language.

TECHNICAL FIELD

The invention relates to a method and to a system for guidance of driver behaviour during driving of vehicles in the context of hilltop driving. The invention relates also to a motor vehicle practicing the method and using the system. The invention also relates to a computer programme and a computer programme product for causing performance of the method.

BACKGROUND

Economical driving by efficient utilisation of the kinetic energy of vehicles such as trucks with a view to fuel saving is becoming increasingly common. One way of achieving it is to minimise the use of brakes on downhill runs, preferably by the driver releasing the accelerator in good time before the declivity and thereby throttling the fuel supply, resulting in a reduction in the vehicle's speed. This loss of speed is then recouped "gratis" downhill.

A known practice is to use the vehicle's cruise control to run the vehicle in a fuel-economizing way on the basis of the vehicle's location and map data along its itinerary by varying its speed on the basis of the nature of the topology ahead.

It is however not always appropriate to use the cruise control, e.g. on winding and hilly roads where the need to utilise the vehicle's kinetic energy for fuel saving may be greater and the demands upon the driver correspondingly more exacting. Some drivers will also choose not to use the cruise control. Fuel economy is thus made difficult in situations where cruise control guidance based on map data along the itinerary is not employed.

OBJECTS OF THE INVENTION

Objects of the present invention are to propose a method and a system for guidance of driver behaviour during driving of vehicles in the context of hilltop driving, which makes it easier to reduce the vehicle's fuel consumption.

SUMMARY OF THE INVENTION

These and other objects indicated by the description set out below are achieved by a method and system for guidance of driver behaviour during driving of vehicles in the context of hilltop driving, by a motor vehicle and by a computer programme and a computer programme product of the kinds disclosed herein.

The invention achieves the object with a method for guidance of driver behaviour during driving of vehicles in the context of hilltop driving, comprising the steps of continuously determining the topography along the vehicle's itinerary as a basis for determining a profile of its speed, presenting the vehicle's driver with suggestions for action concerning the driving of the vehicle with a view to desired reduction of fuel consumption. The action comprises reduced power mobilisation before a hilltop transition and the profile of the vehicle speed is determined as a result of the action, whereby the step of presenting the vehicle's driver with suggestions for the action, is subject to desired consideration to given subconditions. Reduced fuel consumption during the hilltop driving is thus facilitated. Presenting the driver with suggestions, such as to reduce power mobilisation, i.e. release the accelerator, or to deactivate the vehicle's normal cruise control function which keeps the vehicle's speed at a set level, i.e. deactivate the cruise control, in good time before a declivity is useful in helping inexperienced drivers on the road to adopt economical fundamental behaviour in their hilltop driving. It may also help experienced drivers in situations where road conditions are difficult to judge, e.g. on winding roads or roads where the speed increase on a coming downhill run is hard to predict.

This also makes it easier to reduce fuel consumption in the context of hilltop driving in that the driver's attention is drawn to adjusting the vehicle's speed by said reduction of said power mobilisation before the hilltop transition.

Furthermore the subconditions comprise the following requirements for the vehicle's speed relative to a reference speed of the vehicle in response to reduced power mobilisation: to drop by a predetermined largest amount before the hilltop transition; to drop by a predetermined smallest amount before the hilltop transition; to reach or exceed the reference speed after the hilltop transition. This means that no suggestion to reduce power mobilisation is presented to the driver in cases where there is risk of the hilltop driving being felt to be unnatural or where the reduction would not result in any substantial decrease in fuel consumption.

The subcondition that in response to reduced power mobilisation the vehicle's speed relative to a reference speed should drop by a predetermined largest amount before the hilltop transition prevents the hilltop driving from being found unnatural by the driver in that too large a speed decrease before a hilltop transition might feel unnatural. The risk of the driver ignoring presented suggestions to reduce power mobilisation is thus diminished and the probability of the hilltop driving resulting in reduced fuel consumption is correspondingly increased.

A subcondition is that in response to reduced power mobilisation, the vehicle's speed relative to a reference speed should drop by a predetermined smallest amount before the hilltop transition. This prevents the presentation of suggestions for reduction of power mobilisation if the reduction would not result in any substantial difference, i.e. no real decrease in fuel consumption during the hilltop driving.

The subcondition that in response to reduced power mobilisation the vehicle's speed relative to a reference speed should reach or exceed the reference speed after the hilltop transition prevents the presentation of suggestions for reduction of power mobilisation if the reduction would not result in the vehicle at least reaching or preferably exceeding the reference speed, which in one variant is the vehicle's speed before power mobilisation reduction. This prevents the hilltop driving from being felt as being unnatural by the driver, by his possibly finding it unnatural that after the hilltop driving, the vehicle does not roll up at or exceed the speed before the power mobilisation reduction. The risk of the driver ignoring presented suggestions to reduce power mobilisation is thus diminished and the probability of the hilltop driving resulting in reduced fuel consumption is correspondingly increased.

In one embodiment of the method the subconditions comprise: that there should be power mobilisation; that the vehicle's cruise control function which provides guidance on the basis of the topography should not be activated; that the vehicle should not be in a performance mode in which fuel economy is subordinate; that the vehicle's speed should not be below a predetermined level. The presentation of suggestions for reduction of power mobilisation is thus prevented when such reduction is not possible/appropriate/justified. The subcondition that the vehicle's cruise control function should not be activated refers here to cruise control functions which provide guidance automatically on the basis of the topography. A conventional cruise control function may be activated and suggestions for said action may still be presented.

The subcondition that there should be power mobilisation prevents the presentation of suggestions for reduction of power mobilisation when such reduction is not possible, thereby avoiding unnecessary disturbance to the driver.

The subcondition that the vehicle should not be in a performance mode in which fuel economy is subordinate prevents the presentation of suggestions for reduction of power mobilisation when such reduction is not justified in cases where the driver chooses to prioritize some other factor than fuel economy, e.g. operability.

The subcondition that the vehicle's speed should not be below a predetermined level prevents the presentation of suggestions for reduction of power mobilisation when the vehicle's speed is so low that such reduction is not justified and would be of no fuel economy advantage.

The invention achieves the object with a system for guidance of driver behaviour during driving of vehicles in the context of hilltop driving, comprising means for continuously determining the topography along the vehicle's itinerary as a basis for determination of a profile of its speed means for presenting the vehicle's driver with suggestions for said action concerning the driving of the vehicle with a view to desired reduction of fuel consumption, in which said action comprises reduced power mobilisation before a hilltop transition and that the profile of the vehicle speed is adapted to be determined as a result of said action, whereby an electronic control unit is adapted to determine whether given subconditions are fulfilled, whereby the means is adapted to be activated for presenting the vehicle's driver with suggestions for action if said given subconditions are determined to be fulfilled. Reduced fuel consumption during the hilltop driving is thus facilitated. Presenting the driver with suggestions such as to reduce power mobilisation, i.e. release the accelerator, or to deactivate the vehicle's normal cruise control function which keeps the vehicle's speed at a set level, i.e. deactivate the cruise control, in good time before a declivity is useful in helping inexperienced drivers on the road to adopt economical fundamental behaviour in their hilltop driving. It may also help experienced drivers in situations where road conditions are difficult to judge, e.g. on winding roads or roads where the speed increase on a coming downhill run is hard to predict.

This also makes it easier to reduce fuel consumption in the context of hilltop driving in that the driver's attention is drawn to adjusting the vehicle's speed by said reduction of said power mobilisation before the hilltop transition.

Furthermore said subconditions comprise the following requirements for the vehicle's speed relative to a reference speed of the vehicle in response to reduced power mobilisation: to drop by a predetermined largest amount before said hilltop transition; to drop by a predetermined smallest amount before said hilltop transition; to reach or exceed said reference speed after said hilltop transition. This means that no suggestion to reduce power mobilisation is presented to the driver in cases where there is risk of the hilltop driving being felt to be unnatural or where the reduction would not result in any substantial decrease in fuel consumption.

In one embodiment of the system the subconditions comprise: that there should be power mobilisation; that the vehicle's cruise control function which provides guidance on the basis of the topography should not be activated; that the vehicle should not be in a performance mode in which fuel economy is subordinate; that the vehicle's speed should not be below a predetermined level. The presentation of suggestions for reduction of power mobilisation is thus prevented when such reduction is not possible/appropriate/justified. The subcondition that the vehicle's cruise control function should not be activated refers here to cruise control functions which provide guidance automatically on the basis of the topography. A conventional cruise control function may be activated and suggestions for said action may still be presented.

BRIEF DESCRIPTION OF DRAWINGS

The present invention will be better understood by reading the detailed description set out below in conjunction with the attached drawings, in which the same reference notations are used for similar items throughout the various views, and FIG. 1 schematically illustrates a motor vehicle according to an embodiment of the present invention, FIG. 2 schematically illustrates a system for guidance of driver behaviour during driving of vehicles in the context of hilltop driving according to an embodiment of the present invention, FIG. 3 schematically illustrates a speed profile as a result of a given form of action before a hilltop transition according to an embodiment of the present invention.

DESCRIPTION OF EMBODIMENTS

Desired consideration means choice of subconditions, i.e. no need to take all the subconditions into account but the possibility of taking any desired number of them.

The subcondition that the vehicle's cruise control function should not be activated refers herein to cruise control functions which provide guidance automatically on the basis of the topography, i.e. that the cruise control function of a cruise control which uses the vehicle's location and map data along the itinerary as a basis for varying its speed on the basis of the nature of the topography ahead should not be activated.

The term "link" refers herein to a communication link which may be a physical connection such as an optoelectronic communication line, or a non-physical connection such as a wireless connection, e.g. a radio link or microwave link.

Figure 1:
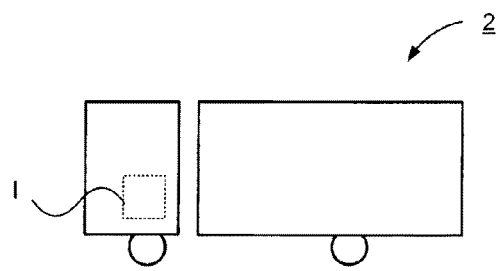

FIG. 1 illustrates schematically a motor vehicle 2 according to an embodiment of the present invention. The vehicle exemplified is a heavy vehicle in the form of a truck but might alternatively be any suitable vehicle, e.g. a bus or a car. The vehicle is provided with a system I according to the present invention.

Figure 2:
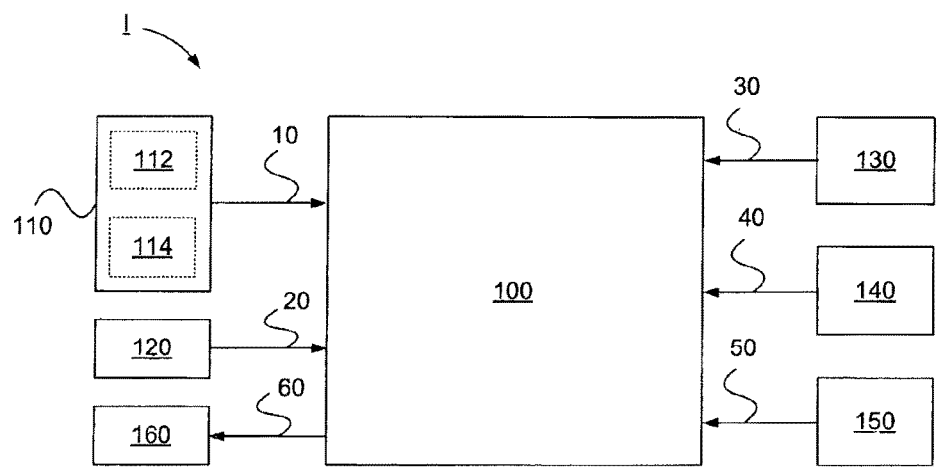

FIG. 2 is a schematic block diagram of a system I for guidance of driver behaviour during driving of vehicles in the context of hilltop driving according to an embodiment of the present invention.

The system I comprises an electronic control unit 100 for said guidance.

The system I comprises itinerary determination means 110 adapted to providing predetermined characteristics of the carriageway along the vehicle's itinerary and the vehicle's location along the itinerary.

Said itinerary determination means comprise in one variant a map information unit 112 providing map data on said characteristics of the carriageway along the vehicle's itinerary, comprising topography and any presence of bends, as a basis for determination of a profile of the vehicle's speed as a result of at least one given form of action concerning its driving, which action comprises in one embodiment reduction of power mobilisation before a hilltop transition in order thereby to be able to optimise fuel consumption.

Said itinerary determination means further comprise vehicle location determination means 114 in the form of a geographical position determination system, i.e. GPS, for identifying the vehicle's location at the time of the respective braking process.

The itinerary determination means, i.e. the map information unit 112 and the vehicle location determination means 114, thus make it possible to continuously identify the vehicle's location and the characteristics of the carriageway, comprising topography, in order thereby to determine a speed profile as a result of a power mobilisation reduction before a hilltop transition.

The system I comprises speed determination means 120 for continuously determining the vehicle's speed. The means 120 comprises in one variant speedometer means.

The system I comprises power mobilisation determination means 130 for determining amounts of power mobilisation. The means 130 comprises in one variant accelerator pedal position determination means for determining whether and, if so, to what extent, i.e. to what position, the accelerator pedal is depressed.

System I further comprises cruise control function determination means 140 for determining whether the vehicle's cruise control function is activated, i.e. whether the vehicle's cruise control is activated. The means 140 in one variant is configured to determine whether the vehicle's cruise control function with regard to cruise control, comprising adaptation of hilltop driving, is activated.

System I further comprises vehicle mode determination means 150 for determining which vehicle mode the vehicle is in, where the vehicle mode comprises mode focused on operability, herein called performance mode, in which fuel economy is subordinate, and a mode focused on economical operation, herein called economy mode.

System I further comprises action suggestion presentation means 160 for presenting the driver with suggestions for action which in one embodiment comprises reduction of power mobilisation. The means 160 may comprise any appropriate means for presenting action suggestions, comprising means for visual presentation such as continuous or flashing lights indicating suggested forms of action and/or text and/or symbols indicating suggested forms of action, means for auditory presentation comprising alarms and/or voice presentation of suggested forms of action, means for tactile information comprising vibrations or the like to indicate suggested action, e.g. vibration or the like in an accelerator pedal. The means 160 comprise in one variant a vehicle display unit situated in the vehicle's instrument cluster, for presentation of the suggestions for action.

In one embodiment the action comprises acceleration with raised engine torque.

The electronic control unit 100 is signal-connected to the itinerary determination means 110 via a link 10 enabling it to receive from the means 110 a signal which represents itinerary data comprising location data from the vehicle location determination means 114 and map data comprising topography data from the map information unit 112, in order to determine a profile of the vehicle's speed as a result of at least one given form of action concerning its driving, here power mobilisation reduction before a hilltop transition.

The electronic control unit 100 is signal-connected to the speed determination means 120 via a link 20 enabling it to receive from the means 120 a signal which represents data on the vehicle's speed.

The electronic control unit 100 is signal-connected to the power mobilisation determination means 130 via a link 30 enabling it to receive from the means 130 a signal which represents data for determining amounts of power mobilisation.

The electronic control unit 100 is signal-connected to the cruise control function determination means 140 via a link 40 enabling it to receive from the means 140 a signal which represents data for determining whether the vehicle's cruise control function is activated, which function comprises the topography.

The electronic control unit 100 is signal-connected to the vehicle mode determination means 150 via a link 50 enabling it to receive from the means 150 a signal which represents data on which mode the vehicle is in, i.e. performance mode or economy mode.

The electronic control unit 100 is signal-connected to the action suggestion presentation means 160 via a link 60. The electronic control unit 100 is adaptet via the link 60 to send a signal to the action suggestion presentation means 160, which represents data for presenting the driver with suggestions for action which in one embodiment comprises reduction of power mobilisation.

The electronic control unit 100 is adapted to processing the itinerary data comprising location data from the vehicle location determination means 114, map data comprising topography data from the map information unit 112 and the speed data from the speed determination means 120, in order to determine a profile of the vehicle's speed as a result of at least one given form of action concerning its driving, which in one embodiment comprises power mobilisation reduction before a hilltop transition. In one variant, as previously mentioned, the action may comprise acceleration with raised action torque.

The electronic control unit 100 is adapted to determining whether the speed profile as a result of power mobilisation reduction before a hilltop transition fulfils given subconditions. These subconditions are discussed in more detail with reference to FIG. 3.

The electronic control unit 100 is adapted to determining whether further subconditions are fulfilled before a hilltop transition. In one embodiment, the subconditions comprise one or more from among the following: that there should be power mobilisation, that the vehicle's cruise control function should not be activated, that the vehicle should not be in a performance mode in which fuel economy is subordinate and that its speed should not be below a predetermined level.

The subcondition that there should be power mobilisation prevents the presentation of suggestions for reduction of power mobilisation when such reduction is not possible, thereby avoiding unnecessary disturbance to the driver. The electronic control unit 100 is thus adapted to processing the power mobilisation data in order to determine amounts of power mobilisation, i.e. determine whether the driver has depressed the accelerator pedal.

The subcondition that the vehicle should not be in a performance mode in which fuel economy is subordinate prevents the presentation of suggestions for reduction of power mobilisation when such reduction is not justified in cases where the driver chooses to prioritize some other factor than fuel economy, e.g. operability. The electronic control unit 100 is thus adapted to processing said data on which mode the vehicle is in, i.e. performance mode or economy mode.

The subcondition that the vehicle's speed should not be below a predetermined level prevents the presentation of suggestions for reduction of power mobilisation when the vehicle's speed is so low that such reduction is not justified and would be of no fuel economy advantage. The electronic control unit 100 is thus adapted to processing the speed data and comparing them with the predetermined level in order to determine whether the vehicle's speed is below the predetermined level.

If said subconditions are fulfilled, the electronic control unit 100 is adapted to sending to the action suggestion presentation means 160 via the link a signal which represents data for presenting the driver with suggestions to reduce power mobilisation for desired lowering of fuel consumption during hilltop driving ahead.

The electronic control unit 100 is adapted to determining whether the speed profile resulting from acceleration with raised engine torque during a hilltop transition process fulfils given subconditions. In one embodiment of the method, the subconditions comprise the requirement that in response to acceleration with raised engine torque, the vehicle's speed relative to a reference level should increase at a predetermined rate and should on a subsequent climb drop at a predetermined rate. In one variant, the condition for these speeds depends on the reference level. In one variant, the condition for them depends on the vehicle's weight. The possibility of avoiding a downshift is thus enhanced, making it easier to reduce fuel consumption. Time saving is also made possible, e.g. by regaining time lost during speed drops. In one example, the condition might be the requirement that given substantially full power mobilisation, i.e. acceleration with raised torque, the vehicle's speed increases for example by 2 km/h before subsequently dropping for example by at least 4 km/h uphill despite maximum torque.

Figure 3:
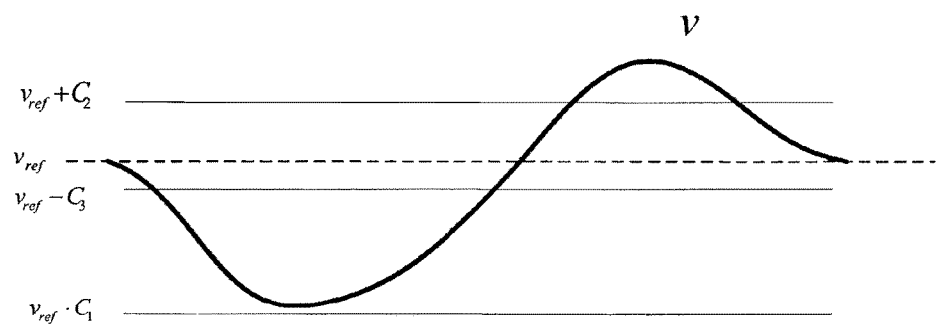

FIG. 3 schematically illustrates a speed profile resulting from a given form of action before a hilltop transition according to an embodiment of the present invention.

In one embodiment the subcondition comprises the requirement that in response to reduced power mobilisation the vehicle's speed v relative to a reference level $v_{ref}$ should drop by a predetermined largest amount before the hilltop transition. The reference level $v_{ref}$ in one embodiment is the vehicle's speed before the hilltop transition before power mobilisation reduction. The reference level $v_{ref}$ may in one alternative variant be load-dependent.

The electronic control unit 100 is adapted accordingly to determining whether in response to reduced power mobilisation the vehicle's speed v relative to the reference level $v_{ref}$ will drop by a predetermined largest amount before the hilltop transition.

The predetermined amount is defined in one variant as $v_{ref}*C_1$, in which $C_1$ may be a constant or a variable between 0 and 1, e.g. a percentage of $V_{ref}$. In one variant $C_1$ is a function of $v_{ref}$. In one variant $C_1$ depends on the itinerary determination means such that in economy mode $C_1$ in one variant is about 12% below $v_{ref}$ and in normal operation perhaps 6-8% below $v_{ref}$.

The reference level $v_{ref}$ may in one variant be the speed before a steep hill followed by a declivity, with the vehicle heavily laden. Here the vehicle will lose speed. If for example it is trying to maintain 80 km/h and is maintaining it at the beginning of the climb, it will drop for example to 50 km/h uphill. As it is desirable that 80 km/h should still be the desired speed and therefore serve as the reference level $v_{ref}$ it is desired to prevent any further loss of speed, e.g. from 50 to 45 km/h, so no suggestion for reduction of power mobilisation will be presented to the driver.

The subcondition that in response to reduced power mobilisation, the vehicle's speed v relative to a reference speed $v_{ref}$ should drop by a predetermined largest amount before the hilltop transition prevents the hilltop driving from being felt unnatural by the driver, in that too large a speed decrease before a hilltop transition might feel unnatural. The risk of the driver ignoring presented suggestions to reduce power mobilisation is thus diminished and the probability of the hilltop driving resulting in reduced fuel consumption is correspondingly increased.

In one embodiment said subcondition comprises the requirement that in response to reduced power mobilisation the vehicle's speed v relative to a reference $v_{ref}$ should drop by a predetermined smallest amount before the hilltop transition.

The requirement that in response to reduced power mobilisation the vehicle's speed v relative to a reference level $v_{ref}$ should drop by a predetermined smallest amount before the hilltop transition prevents the presentation of suggestions for reduction of power mobilisation if such reduction would result in no substantial difference, i.e. no real reduction in fuel consumption during the hilltop driving.

The electronic control unit 100 is adapted accordingly to determining whether in response to reduced power mobilisation the vehicle's speed v relative to its reference level $v_{ref}$ will drop by a predetermined smallest amount before the hilltop transition.

The predetermined amount is defined in one variant as $v_{ref}-C_2$, in which $C_2$ may be a constant or a variable. In one variant $C_2$, is a function of $v_{ref}$. In one variant it is of the order of 0-5 km/h, in one variant 1-3 km/h, e.g. about 1.5 km/h.

In one embodiment said subcondition comprises the requirement that in response to reduced power mobilisation the vehicle's speed v relative to a reference level $v_{ref}$ should reach or exceed $v_{ref}$ after the hilltop transition. This means that no suggestions for reduction of power mobilisation will be presented to the driver when there is risk of the hilltop driving being felt to be unnatural and when the reduction would result in no substantial decrease in fuel consumption.

The subcondition that in response to reduced power mobilisation the vehicle's speed v relative to a reference level $v_{ref}$ of its speed should reach or exceed the reference level after the hilltop transition prevents the presentation of suggestions for reduction of power mobilisation, if the reduction would not result in the vehicle at least reaching or preferably exceeding the reference level $v_{ref}$, which in one variant is the vehicle's speed before power mobilisation reduction. This prevents the hilltop driving from being felt unnatural by the driver, by possibly finding it unnatural that the vehicle after the hilltop driving does not roll up at or exceed the speed which the vehicle was at before the power mobilisation reduction. The risk of the driver ignoring presented suggestions to reduce power mobilisation is thus diminished and the probability of the hilltop driving resulting in reduced fuel consumption is correspondingly increased.

The electronic control unit 100 is adapted accordingly to determining whether in response to reduction of power mobilisation the vehicle's speed v relative to a reference level $v_{ref}$ of its speed will reach or exceed the reference level after the hilltop transition.

The predetermined amount is defined in one variant as $v_{ref}-C_3$, in which $C_3$ may be a constant or a variable. In one variant $C_3$ is a function of $v_{ref}$. In one variant it is of the order of 0-5 km/h, in one variant 1-3 km/h, e.g. about 2 km/h.

Figure 4:
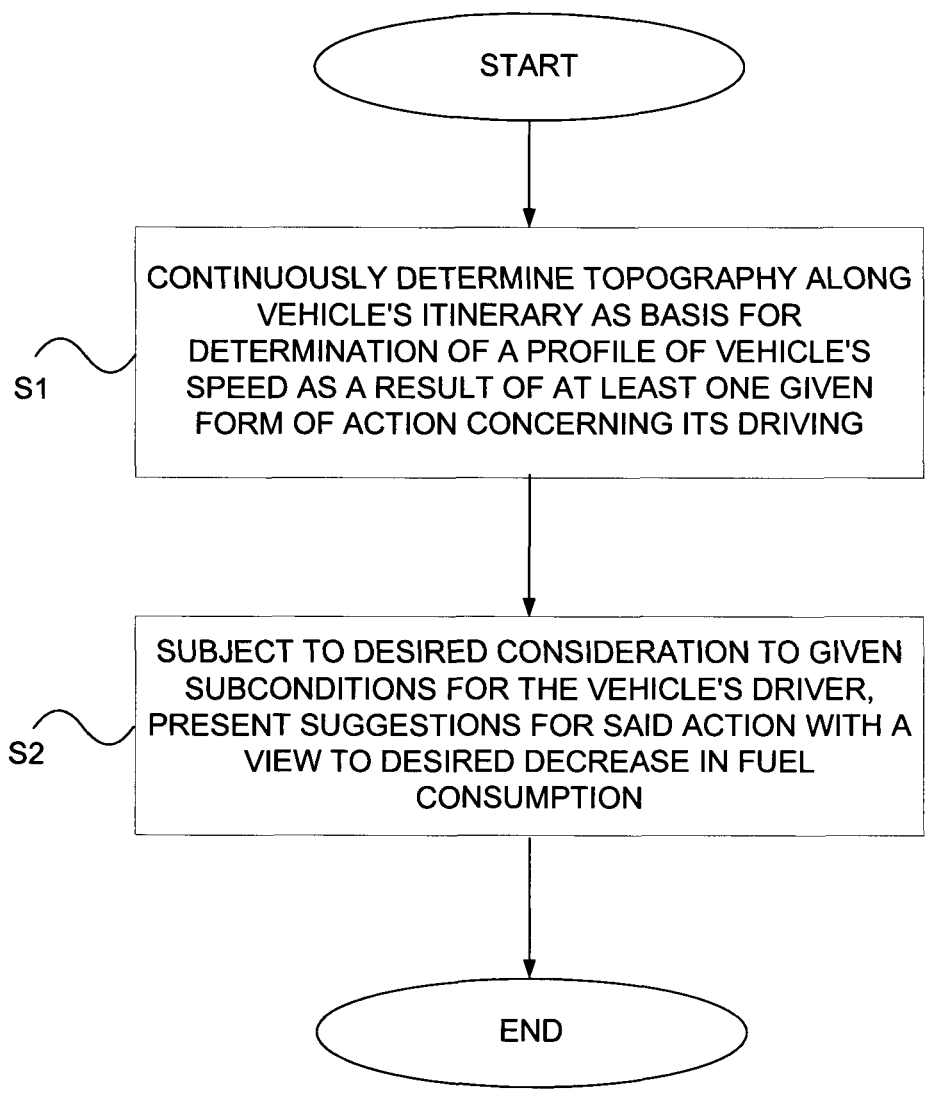
FIG. 4 is a schematic block diagram of a method for guidance of driver behaviour during driving of vehicles in the context of hilltop driving according to an embodiment of the present invention, and FIG. 5 schematically illustrates a computer according to an embodiment of the present invention.

FIG. 4 is a schematic block diagram of a method for guidance of driver behaviour during driving of vehicles in the context of hilltop driving according to an embodiment of the present invention.

In one embodiment the method for guidance of driver behaviour during driving of vehicles in the context of hilltop driving comprises a first step S1 in which topography along the vehicle's itinerary is continuously determined as a basis for determination of a profile of its speed as a result of at least one given form of action concerning its driving.

In one embodiment the method for guidance of driver behaviour during driving of vehicles in the context of hilltop driving comprises a second step S2 in which, subject to desired consideration to given subconditions for the vehicle's driver, suggestions are presented for the action with a view to desired decrease in fuel consumption.

Figure 5:
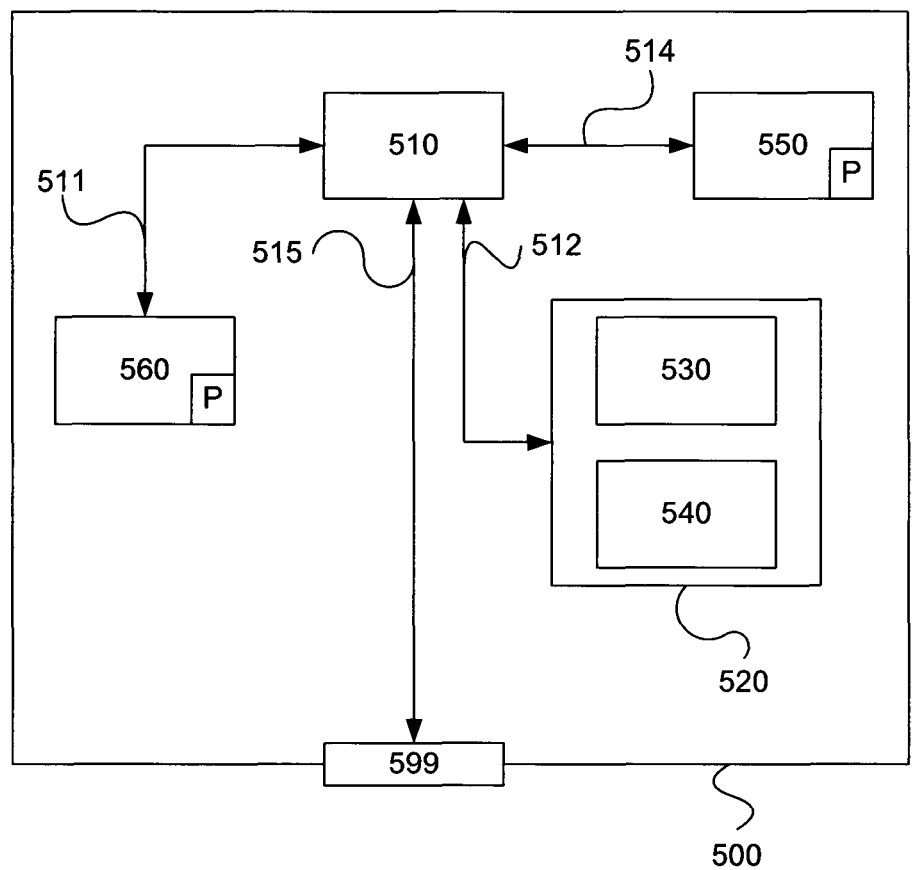

FIG. 5 is a diagram of one version of a device 500. The control unit 100 described with reference to FIG. 2 may in one version comprise the device 500. The device 500 comprises a non-volatile memory 520, a data processing unit 510 and a read/write memory 550. The non-volatile memory has a first memory element 530 in which a computer programme, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory has also a second memory element 540.

A proposed computer programme P comprises routines for guidance of driver behaviour during driving of vehicles in the context of hilltop driving according to the innovative method. The programme comprises routines for continuously determining topography along the vehicle's itinerary as a basis for determination of a profile of its speed as a result of at least one given form of action concerning its driving. It comprises routines, subject to desired consideration to given subconditions for the vehicle's driver, for presenting suggestions for the action with a view to desired decrease in fuel consumption. The programme may be stored in an executable form or in compressed form in a memory 560 and/or a read/write memory 550.

Where the data processing unit 510 is described as performing a certain function, it means that it conducts a certain part of the programme stored in the memory 560 or a certain part of the programme stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit via a data bus 511. The read/write memory 550 is adapted to communicating with the data processing unit via a data bus 514. The links associated for example with the control unit 100 may be connected to the data port.

When data are received on the data port 599, they are stored temporarily in the second memory element 540. When input data received have been temporarily stored, the data processing unit 510 is prepared to conduct code execution as described above. The signals received on the data port may be used by the device 500 to continuously determine topography along the vehicle's itinerary as a basis for determination of a profile of its speed as a result of at least one given form of action concerning its driving. The signals received on the data port may be used by the device 500, subject to desired consideration to given subconditions for the vehicle's driver, to present suggestions for said action with a view to desired decrease in fuel consumption.

Parts of the methods herein described may be conducted by the device 500 by means of the data processing unit 510 which runs the programme stored in the memory 560 or the read/write memory 550. When the device 500 runs the programme, methods herein described are executed.

The above description of the preferred embodiments of the present invention is provided for illustrative and descriptive purposes. It is not intended to be exhaustive, nor to restrict the invention to the variants described. Many modifications and variations will obviously suggest themselves to one skilled in the art. The embodiments have been chosen and described in order best to explain the principles of the invention and their practical applications and thereby make it possible for one skilled in the art to understand the invention for different embodiments and with the various modifications appropriate to the intended use.

The invention claimed is:

1. A method for guidance of driver behavior during driving of a vehicle, the method comprising the steps of:
    continuously determining topography along a hilly itinerary of the vehicle as a basis for determination of a profile of a speed of the vehicle;
    suggesting an action concerning the driving of the vehicle so as to guide reduction of vehicle fuel consumption, the action comprising reduced power mobilisation of the vehicle before a hilltop transition;
    determining the profile of the speed of the vehicle as a result of the identified action;
    automatically presenting to the vehicle's driver the suggestion for the action only in response to a determination that, in response to a taking of the action, the speed of the vehicle relative to a reference vehicle speed level will at least one of:
    drops by a predetermined largest amount before the hilltop transition,
    drops by a predetermined smallest amount before the hilltop transition, and
    reaches or exceeds the reference vehicle speed level after the hilltop transition.

2. A method according to claim 1, wherein the subconditions comprise requirements that:
    there be power mobilisation;
    a vehicle's cruise control function is not activated;
    the vehicle is not in a performance mode in which fuel economy is subordinate; and
    the vehicle's speed is not below a predetermined level.

3. A system for guidance of driver behavior during driving of a vehicle in a context of hilltop driving, the system comprising:

a topography determiner configured to determine continuously topography along an itinerary of the vehicle as a basis for determination of a profile of the vehicle's speed;

an electronic control unit configured to suggest an action for driving of the vehicle to achieve a target reduction of fuel consumption, wherein the action comprises reduced power mobilisation before a hilltop transition;

the electronic control unit configured to adapt a profile of the vehicle speed, the profile of the vehicle speed determined as a result of the action, by determining whether at least one subcondition of a plurality of subconditions is fulfilled; and the electronic control unit configured to activate a driver suggestion presenter only when the subcondition is determined to be fulfilled;

wherein the subconditions comprise a requirement that in response to reduced power mobilisation caused by the action, the vehicle's speed relative to a reference vehicle speed level will:

drop by a predetermined largest amount before the hilltop transition, drop by a predetermined smallest amount before the hilltop transition; and reach or exceed the reference vehicle speed level after the hilltop transition.

4. A system according to claim 3, wherein the electronic control unit is configured to determine whether further subconditions are fulfilled before the hilltop transition, wherein the further subconditions comprise requirements that:

there is power mobilisation;

the vehicle's cruise control function is not activated;

the vehicle is not in a performance mode in which fuel economy is subordinate; and the vehicle's speed (v) is not below a predetermined level.

5. A vehicle comprising a system according to claim 3.

6. A computer programme product comprising a non-transitory digital storage medium which stores a computer programme for guidance of driver behavior during driving of a vehicle in the context of hilltop driving, and the programme comprises programme code which, when run by an electronic control unit or another computer connected to the electronic control unit, enables the electronic control unit to perform steps according to claim 1.

* * * * *